(12) United States Patent
Bryant et al.

(10) Patent No.: US 6,850,238 B2
(45) Date of Patent: Feb. 1, 2005

(54) DISPLAY OF CODE POWER LEVELS AND RELATIONSHIPS OF MULTIPLE SPREADING FACTOR ORTHOGONAL CODES IN A CDMA SIGNAL

(75) Inventors: Craig D. Bryant, Portland, OR (US); Thomas L. Kuntz, Portland, OR (US); Kathryn A. Engholm, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 204 days.

(21) Appl. No.: 09/919,690

(22) Filed: Jul. 31, 2001

(65) Prior Publication Data

US 2003/0025704 A1 Feb. 6, 2003

(51) Int. Cl.[7] .................................................. G09G 5/22
(52) U.S. Cl. .............................. 345/440.1; 345/440.2; 382/281; 375/130; 370/241; 702/60; 702/61; 702/68
(58) Field of Search .......................... 345/440.1, 440.2; 702/61, 68; 382/281

(56) References Cited

U.S. PATENT DOCUMENTS

| 6,219,340 B1 | | 4/2001 | Cutler et al. | |
| 6,320,577 B1 | * | 11/2001 | Alexander | ............... 345/440.1 |
| 6,519,227 B1 | * | 2/2003 | Koizumi | ..................... 370/241 |

OTHER PUBLICATIONS

"Agilent Multi–Coded Waveform Quality and Code Domain Measurements for cdma2000." Feb. 14, 2001. Agilent Technologies. Document No. 5988–1989EN. pp. 6–7.*
Examples of two Microsoft Excel 2000 plots. Microsoft Excel 2000, Microsoft Office 2000. © 1985–1999. Figures 1 and 2. Created Oct. 21, 2003.*

* cited by examiner

Primary Examiner—Matthew C. Bella
Assistant Examiner—Antonio Caschera
(74) Attorney, Agent, or Firm—Francis I. Gray

(57) ABSTRACT

A display of code power levels and relationships of multiple spreading factor orthogonal codes in a code division multiple access (CDMA) signal has a first code graph of code domain power (CDP) for all the codes at the largest code spreading factor that includes all codes at all spreading factors plotted in a linear code indexing order and a second graph of CDP where the codes are plotted in bit-reversed order to group together the sub-codes of each code of lower spreading factor. Markers on each graph are tied together such that movement of one marker on one graph to a particular code value causes the other marker on the other graph to move to the corresponding code value. The sub-codes related to a particular code bar in the graphs indicated by the markers may be differentiated by using grey scale or color variations. A base code power level indicator, which may be in the form of a horizontal bar on the bit-reversed order graph spanning the group of sub-codes corresponding to a particular spreading factor, provides a power indication for the base code.

11 Claims, 3 Drawing Sheets

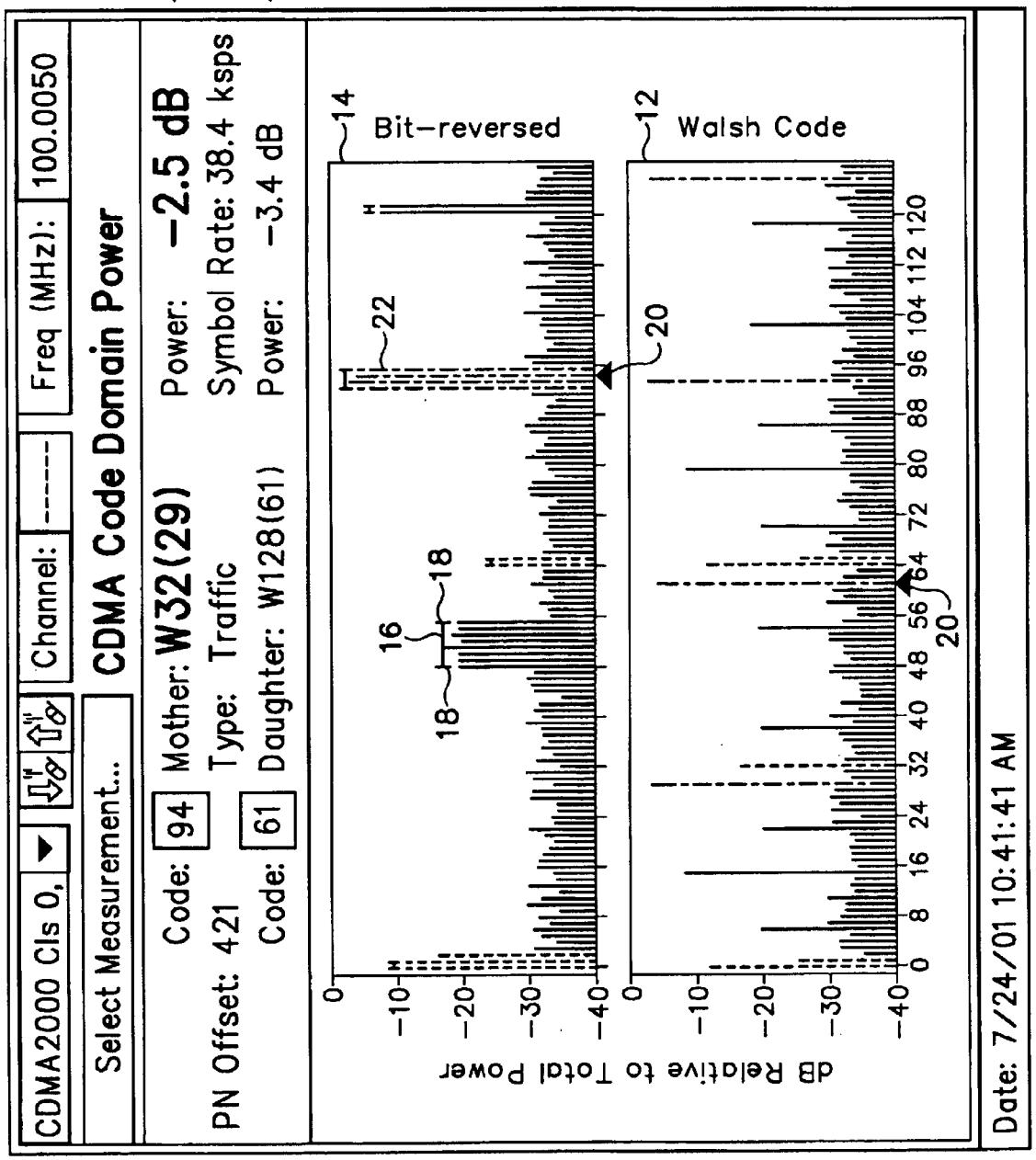

US 6,850,238 B2

DISPLAY OF CODE POWER LEVELS AND RELATIONSHIPS OF MULTIPLE SPREADING FACTOR ORTHOGONAL CODES IN A CDMA SIGNAL

BACKGROUND OF THE INVENTION

The present invention relates to code division multiple access (CDMA) signal analysis, and more particularly to a display of code power levels and relationships of multiple spreading factor orthogonal codes in a CDMA signal.

In a CDMA signal using orthogonal codes, all of which are the same length (also known as spreading factor), the amount of power present in each code, i.e., code domain power (CDP), may be displayed by plotting the power in each code versus the code number index on a two-dimensional graph. This is a conventional and well-understood manner using linear index code order for displaying CDP information. Newer CDMA systems, such as cdma2000, now specify use of codes of varying spreading factors, i.e., of different lengths, which complicates the display of CDP. Specifically codes of smaller spreading factor when displayed in a CDP graph appropriate for the largest spreading factor code appear dispersed into multiple sub-codes at fixed distances determined by their relationship to the larger spreading factor code system, i.e., a code with a spreading factor of 16 when displayed on the code graph for a spreading factor of 128 has 8 sub-codes spaced 8 indices apart. Also the total code power of the lower spreading factor code is not correctly indicated by the power levels of the individual sub-codes. Both of these factors cause difficulty in interpreting the results of CDP calculations when codes of different spreading factor values are present.

U.S. Pat. No. 6,219,340 describes one method of displaying power levels for a CDMA signal having orthogonal codes with different spreading factors or code layers. In this display a power level for each active code channel is displayed using a vertical bar, with the width of the bar indicating in which code layer each active code channel is active. However this display does not highlight the relationship of sub-codes to the base code.

What is desired is a display of code power levels and relationships of multiple spreading factor orthogonal codes in a CDMA signal that highlights the relationship of sub-codes to the base code and indicates the total power of the base code.

BRIEF SUMMARY OF THE INVENTION

Accordingly the present invention provides a display of code power levels and relationships of multiple spreading factor orthogonal codes in a CDMA signal using two code graphs, one in conventional linear index code order for the largest spreading factor that includes all code channels regardless of spreading factor and the other in a bit-inverted index code order to group the sub-codes of lower spreading factors together. A marker may be placed at a particular code location in one of the graphs, and a corresponding marker in the other graph moves to indicate the corresponding code location. A base code power indicator in the form of a horizontal bar extends across the sub-codes representing the spreading factor for the base code in the bit-reversed code graph at a level representing the base code power. The code bars related to the code bar indicated by the marker may be highlighted in some manner, such as by grey scale or color variation.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is a plan view diagram of a display of code power levels according to the present invention.

DETAILED DESCRIPTION OF THE INVENTION

Figure 2A:
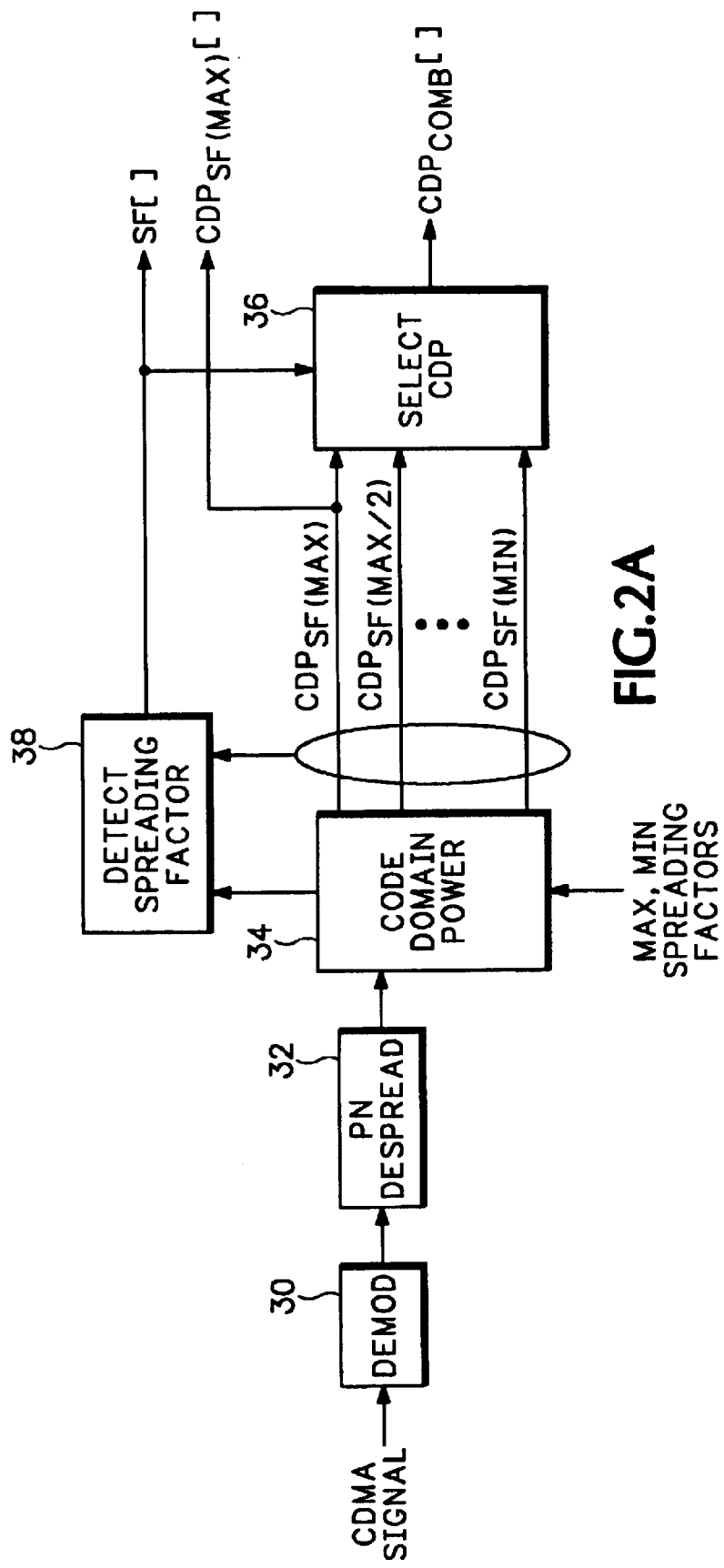
FIGS. 2A and 2B are a block diagram view of a system for displaying code power levels according to the present invention.

Referring now to FIG. 1 two code graphs 12, 14 are shown, each similar to a traditional code domain power (CDP) display for single spreading factor (SF) signals. For signals using Walsh or similar codes for orthogonal code spreading, such as cdma2000, both code graphs 12, 14 are used. For systems using Orthogonal Variable Spreading Factor (OVSF) codes, such as WCDMA, only one traditional code graph 12 is needed. In both cases one code graph 12 is the traditional plot of CDP for all codes at the maximum spreading factor of the system using linear code index order. However with Walsh code spreading this graph 12, referred to as a Walsh Code graph for cdma2000, shows lower spreading factor codes split into multiple sub-codes at various spacings. Then the other code graph 14, if needed because the sub-codes are not contiguous in the first code graph 12 as in cdma2000, shows the same CDP information but with the order of display of code power values reordered by "bit-reversing" the code index numbers of the first code graph. For example for a base code of 29 with an SF of 32, the sub-codes are at 61, 93 and 125 in the first code graph 12 corresponding to binary[0011101, 0111101, 1011101, 1111101] which become in bit-reversed order binary [1011100, 1011110, 1011101, 1011111] in the second, or Bit-reversed, code graph 14 corresponding to 92, 94, 93, 95. This reordering causes the sub-codes of lower SF codes to be grouped together in the second code graph 14. Bit-reversing the index numbers of the CDP display is equivalent to transforming the Walsh code indexing scheme into the OVSF indexing scheme, as is well-known in the art. For signals using OVSF codes the bit-reversed code graph 14 is not needed because the sub-codes group together contiguously without reordering.

For each group of sub-codes identified as belonging to a single lower SF code, a total power display for that code group also is displayed in the second code graph 14. This may be done by showing a horizontal bar 16 at the level of the total power of the base code. The bar width spans the indices of all the related sub-codes, indicating the "width" related to the inverse of the spreading factor of the base code. Wider bars indicate that more sub-codes are used by the base code, corresponding to a lower spreading factor for that code. The individual sub-codes may vary about a nominal value, but the total base code power remains constant unless the code power itself is changed. A variation to the bar 16 is to add vertical "tic" marks 18 at the ends to emphasize the inclusion range of the sub-codes. The tic marks 18 may extend above and/or below the horizontal bar 16.

For Walsh codes using two code graphs 12, 14 the relationship between the codes in the linear code ordering and the bit-reversed ordering is indicated by markers 20 that may be placed at a particular data bar 22 in each graph. When the marker 20 in one code graph 12, 14 is placed at the particular data bar 22, the marker in the other code graph 14, 12 automatically moves to the corresponding data bar with bit-reversed index, i.e., a linear code index of 61 becomes a bit-reversed code index of 94 and vice-versa. The codes associated with a particular code channel associated with the data bar indicated by the marker 20 may be highlighted in both code graphs 12, 14, using either grey scale or color variation. Textual readouts 24, 26 indicate the sub-code or "Daughter" index number (61) corresponding to the marker 20 and sub-code power (−3.4 dB) from the first code graph 12, and the spreading factor (SF32), base or "Mother" code index number (29) and total base code power (−2.5 dB) from the bit-reversed graph 14. The marker 20 may be moved to any data bar on either of the code graphs 12, 14 by touching the particular code graph and moving the marker by either touch and drag, using an associated screen knob or by entering a particular code bar number via a soft keyboard or the like.

Figure 2B:
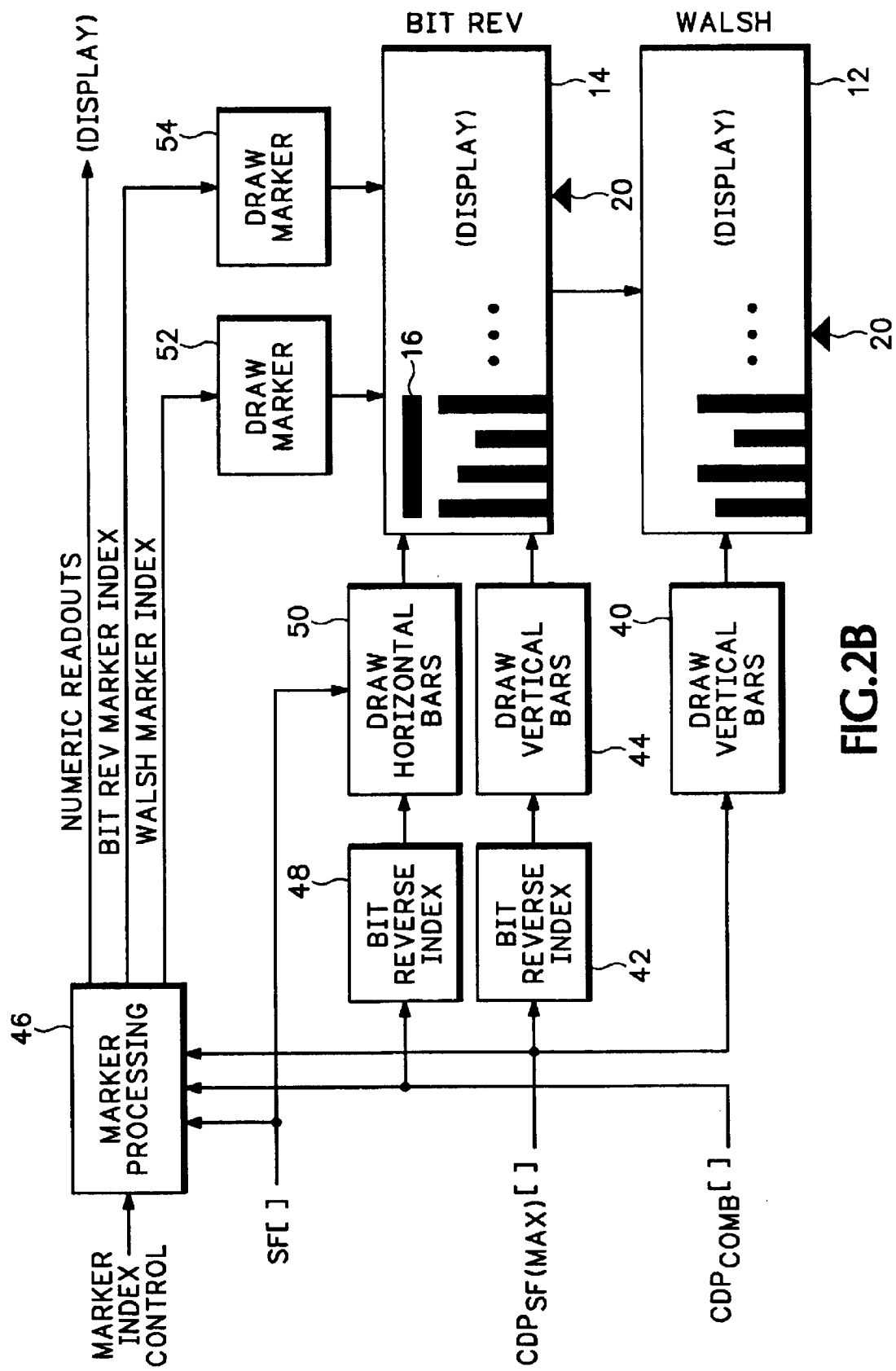

Referring now to FIGS. 2A and 2B a CDMA signal is demodulated to baseband by a demodulator 30 and despread by a pseudo-random noise (PN) despreader 32. The resulting combined baseband CDMA signal is input to a code domain power analyzer 34 to which also are input the minimum and maximum spreading factors for the particular communication network, such as 4 and 128. The code domain power analyzer 34 divides the combined baseband CDMA signal to respective spreading factor CDP signals which are input to a CDP selector 36 and to a spreading factor detector 38. The spreading factor detector 38 determines the spreading factor associated with each code value, which spreading factor serves as a select signal for the CDP selector 36. The output from the CDP selector 36 is a combined CDP signal.

The maximum SF CDP signal is input to a vertical bar draw processor 40 to produce the code bars for the linear index code graph 12, to a bit-reverse indexer 42 followed by another vertical draw processor 44 to produce the code bars for the bit-reversed code graph 14, and to a marker processor 46. The combined CDP signal is input to a bit-reverse indexer 48 followed by a horizontal bar draw processor 50 to which also is input the spreading factor signal to produce the horizontal base code power indicator 16 on the bit-reversed code graph 14 over the extent of the associated sub-codes for a particular spreading factor, and also is input to the marker processor 46 together with the spreading factor signal. The marker processor 46 provides the numeric readouts 24, 26 for the display as well as signals to marker draw processors 52, 54 based further on a marker index control signal that indicates the code bar in one of the code graphs 12, 14 that is identified as the particular code bar.

Thus the present invention provides a display of code power levels. and relationships of multiple spreading factor orthogonal codes in a CDMA signal by presenting the CDP for codes used for orthogonal code spreading in linear and bit-reversed index order code graphs, displaying an indicator for sub-codes that group contiguously for the total code power of each lower spreading factor base code, and linking markers between the two code graphs where the same code power value is located in each code graph.

What is claimed is:

1. A display of code power levels and relationships of multiple spreading factor orthogonal codes in a CDMA signal comprising:
    a first graph of measured code domain power at a maximum spreading factor for the CDMA signal using a linear code index order;
    a second graph of measured code domain power at the maximum spreading factor for the CDMA signal using a bit-reversed code index order such that sub-codes of lower spreading factor codes are grouped together; and
    a power level indicator of measured total base code power for each group of sub-codes in the second graph.

2. The display as recited in claim 1 wherein the power level indicator comprises a horizontal line at the measured total base code power that spans the group of sub-codes.

3. The display as recited in claim 2 wherein the power level indicator further comprises tic marks at each end of the horizontal line to emphasize an inclusion range of the group of sub-codes.

4. The display as recited in claims 1, 2 or 3 further comprising a textual display of sub-code index number and sub-code power from the first graph and spreading factor, base code index number and total base code power from the second graph.

5. The display as recited in claims 1, 2 or 3 further comprising a marker for each graph, the markers being coupled such that movement of the marker on one graph to a particular code value moves the marker on the other graph to a corresponding code value.

6. The display as recited in claim 5 further comprising a textual display of sub-code index number and sub-code power from the first graph and spreading factor, base code index number and total base code power from the second graph.

7. A method of displaying code power levels and relationships of multiple spreading factor orthogonal codes in a CDMA signal comprising the steps of:
    generating a first graph of measured code domain power at a maximum spreading factor for the CDMA signal using a linear code index order;
    generating a second graph of measured code domain power at the maximum spreading factor for the CDMA signal using a bit-reversed code index order such that sub-codes of lower spreading factor codes are grouped together; and
    generating a power level indicator of total base code power for each group of sub-codes in the second graph.

8. The method as recited in claim 7 further comprising the step of providing a textual display of sub-code index number and sub-code power from the first graph and spreading factor, base code index number and total base code power from the second graph.

9. The method as recited in claim 7 further comprising the step of providing a marker for each graph, the markers being coupled such that movement of one marker on one graph to a particular code value moves the marker on the other graph to a corresponding code value.

10. The method as recited in claim 9 further comprising the step of providing a textual display of sub-code index number and sub-code power from the first graph and spreading factor, base code index number and total base code power from the second graph.

11. A method of generating a display of code power levels and relationships of multiple spreading factor orthogonal codes for a CDMA signal comprising the steps of:
    analyzing the CDMA signal to produce a measured code domain power at a maximum spreading factor and a spreading factor for each orthogonal code together with a combined measured code domain power at each spreading factor;
    generating from the measured code domain powers at the maximum spreading factor a first graph of code domain power using a linear code index order;

generating from the measured code domain powers at the maximum spreading factor a second graph of code domain power using a bit-reversed code index order such that sub-codes of lower spreading factor codes are grouped together; and generating from the spreading factors and the combined measured code domain powers a power level indicator for each group of sub-codes in the second graph.

* * * * *